March 10, 1936. C. S. BOSSIE 2,033,607
WASHING MACHINE
Filed Feb. 27, 1934 2 Sheets-Sheet 1

INVENTOR:
CHARLES S. BOSSIE
BY
ATTORNEY

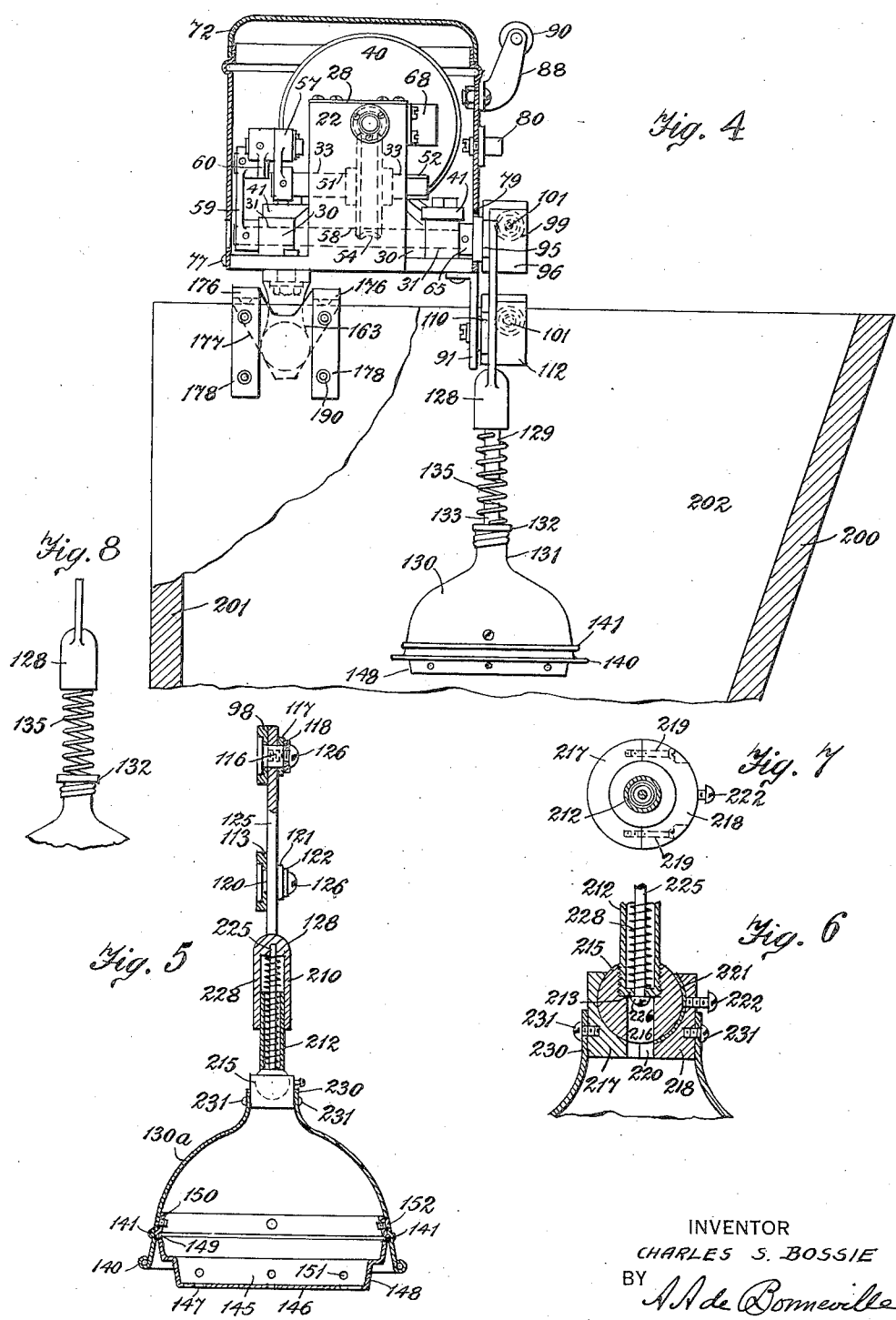

Patented Mar. 10, 1936

2,033,607

UNITED STATES PATENT OFFICE 2,033,607

WASHING MACHINE

Charles S. Bossie, New York, N. Y., assignor to Perfection Appliances, Inc., New York, N. Y., a corporation of New York Application February 27, 1934, Serial No. 713,080

4 Claims. (Cl. 248—2)

This invention relates to a washing machine, and is an improvement of the washing machine described in my patent application filed September 22nd, 1932, Serial Number 634,327, now Patent No. 1,992,141.

The object of the present invention is the production of means for supporting the washing machine on a washtub or other receptacle, with means for holding it in position over the tub or receptacle, and also for locating it therein.

The second object of the invention comprises, flexible means coacting with its suction plungers, whereby the latter not only can rise and fall with any obstruction that may be in the washtub, but that can also tilt the said suction plungers when contacting with said obstruction.

The third object of the invention comprises novel locking connections between its oscillating beam and oscillating shaft.

Other objects will be apparent from the following description and claims.

Figure 1:
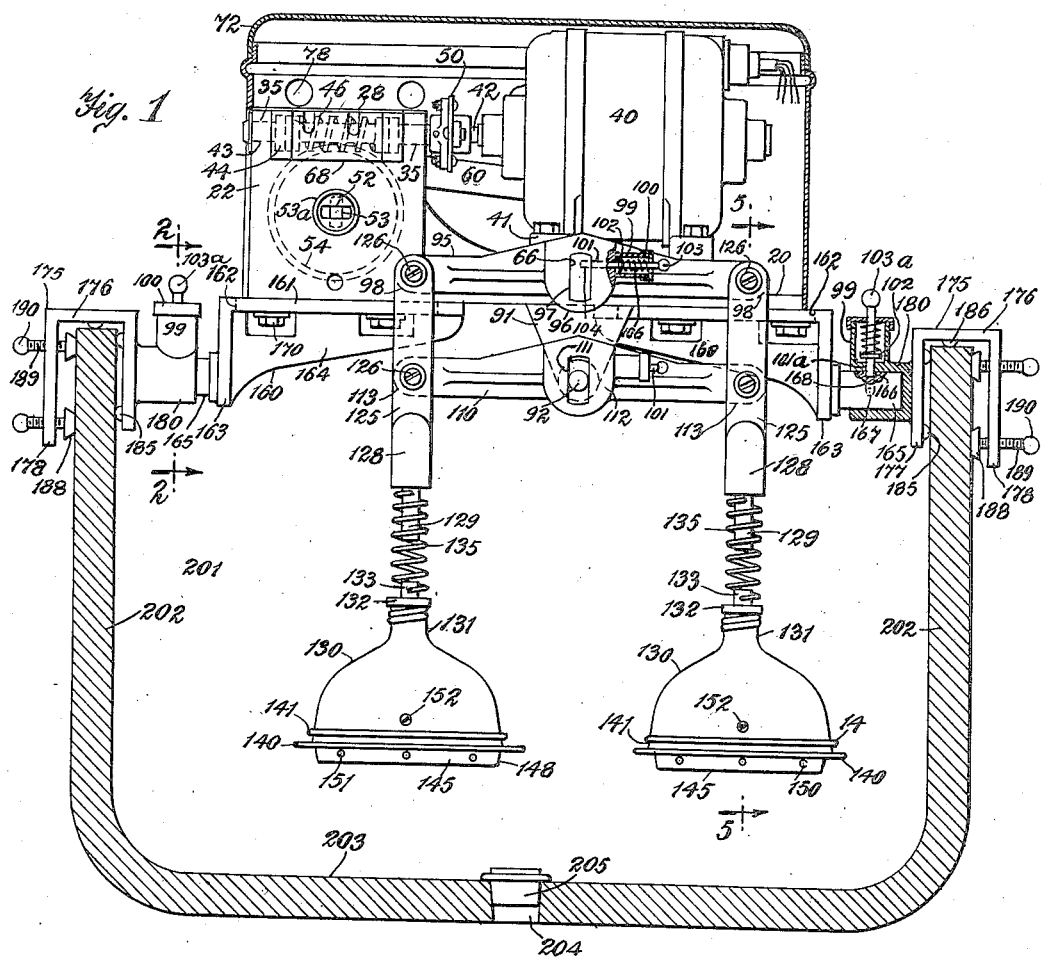
Figure 3:
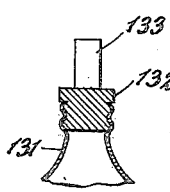
Figure 2:
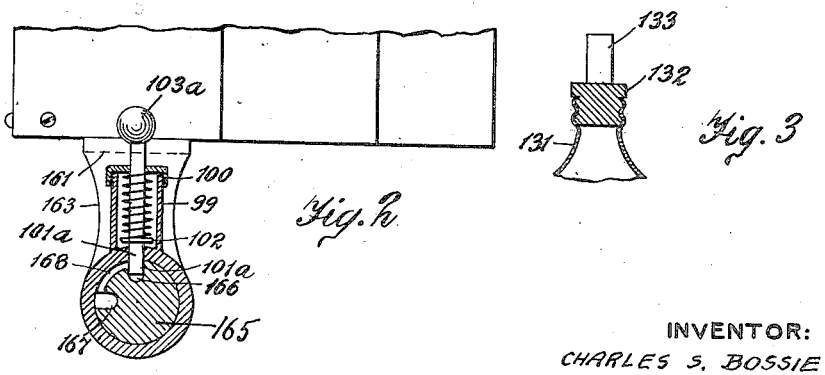

In the accompanying drawings Fig. 1 represents a front elevation of an exemplification of the improved washing machine partly in section and in operative position for a wash tub; Fig. 2 shows an enlarged partial end view and section of Fig. 1 on the line 2, 2; Fig. 3 shows some details; Fig. 4 indicates a left hand side view of Fig. 1 with portions shown in section; Fig. 5 represents an enlarged section of Fig. 1 as on the line 5, 5 with a modification; Fig. 6 shows an enlarged fragmentary portion of Fig. 5; Fig. 7 is a partial top view of Fig. 6, and Fig. 8 is a fragmentary portion of Fig. 1 with a further modification.

The washing machine in this instance comprises a platform 20. A gear housing 22 extends up from the platform 20, and has bolted thereto the cover 28. Supporting blocks 30 extend up from the platform 20 and are indicated with the journal bearings 31. Journal bearings 33 are formed with a pair of the walls of the gear housing 22 and journal bearings 35 are indicated in said housing. An electric motor 40 is shown having the feet 41 which are bolted to the supporting blocks 30. The armature shaft of the electric motor is indicated at 42.

In the journal bearings 35 is journaled the worm shaft 43 which has secured thereto the thrust collar 44. A worm 46 is fastened to the worm shaft 43. The armature shaft 42 and the worm shaft 43 are detachably connected to each other by the coupling 50. In the journal bearings 33 is journaled the shaft 51, which at its front end has integral therewith the locking projection 52 with the flat sides 53. A locking sleeve is shown at 53a. The worm wheel 54 is fastened to the shaft 51 and is in mesh with the worm 46. To the shaft 51 is fastened one end of the arm 57. In the journal bearings 31 is journaled the oscillating cross shaft 58 to which is fastened one end of the arm 59. A link 60 connects the arms 57 and 59. To the front end of the shaft 58 is fastened the supporting collar 65 having the projection with the flat side faces 66. To the front wall of the gear housing 22 is bolted the bracket 68.

A detachable cover 72 is fastened to the platform 20, by means of the screws 77. In the rear wall of said cover 72 are indicated ventilating openings 78. An opening 79 is indicated in the front wall of the cover 72 for the collar 65. From the front wall of the cover 72 extends the upper guide pin 80. To the front wall of the cover 72 are fastened brackets 88 which support the handle 90. The bracket 91 is fastened to and depends from the platform 20, and has extending therefrom the lower guide pin 92.

An upper oscillating beam is indicated at 95, and comprises the hub portion 96 having the vertical opening 97. End hubs are shown at 98. With the hub portion 96 is indicated a latch housing 99 having the detachable cover 100 in threaded engagement therewith. A latch pin 101 having the collar 102 and the operating knob 103 extends through the housing 99 and its cover 100 and is adapted to enter a latch opening 104 in the projection of the collar 65 having the flat side faces 66. A spring 106 bears between the collar 102 and the cover 100. By means of the latch pin 101, the oscillating beam 95 is detachably locked to the projection having the flat side faces 66 of the collar 65 and which is one of the novel features of the present invention.

A lower oscillating beam is shown at 110 which is similar to the oscillating beam 95 and is indicated having the vertical opening 111 similar to the opening 97. A hub portion is shown at 112 and hub ends are indicated at 113 for the lower oscillating beam 110. The hub portion 112 of the beam 110 is also provided with the latch pin 101 and its appurtenances as already described.

In the hub ends 98 are positioned the supporting pins 116, see Fig. 5, with the washers 117 and the lock washers 118. In the hub ends 113 are supported the supporting pins 120, similar to 116 with its washers 121 and 122. Stems 125 are pivoted on the pins 116 and 120. Screws 126 are in threaded engagement with the pins 116 and 120 to maintain the stems 125 in place. Integral with the lower end of each of the stems 125, see Figs. 1, 3, and 4, is indicated the housing 128 from which extends the guide rod 129. Suction plungers are indicated with their hood shaped shells 130. The shells have each the neck 131 in which is screwed a plug 132, having the guide rod 133 extending up therefrom. A helical spring 135 is shown with its upper end encircling the guide rod 129 and fastened thereto, and its lower end encircles the guide rod 133 and is fastened thereto.

The lower portion of the shell 130 is similar to the lower portion of the shell 130a, see Fig. 5 and is indicated with the turned up flange 140 and adjacent to the latter is shown the outwardly extending locking flange 141. For each hood shaped shell is indicated the lower head 145 having the bottom wall 146 with the openings 147, and the circular stepped side wall 148 having the locking flange 149 and the upper projecting portion 150. Openings 151 are indicated in the wall 148. The flange 149 locks with the flange 141 and screws 152 secure the projecting portion 150 to the shell 130.

A pair of supporting brackets are each indicated in its entirety by the numeral 160. Each of the brackets 160 comprises the horizontal flange 161 having the longitudinal opening 162 and the vertifical flange 163, connected by the rib 164. From the flange 163 extends the trunnion 165 with the latch opening 166, and the latch opening 167 at right angles thereto. The said openings both extend some distance below the circumferential surface of the trunnion and are connected by the groove 168 in the surface of the trunnion. Each of said brackets are adjustably connected to the platform 20 of the washing machine by the bolts 170 which extend through the openings 162.

A pair of U shaped clamping brackets are each indicated in its entirety by the numeral 175.

Each of the brackets 175 comprises the top horizontal members 176 from which depends the inner vertical member 177 and the outer vertical members 178. From the vertical member 177 extends the sleeve 180, which is supported on its accompanying trunnion 165. Latch housings 99 as already described are each indicated with a detachable cover similar to 100. A latch pin 101a having the collar 102 and the operating knob 103a extends through the housing 99 and a cover similar to 100 and also through an opening in the sleeve 180. A spring similar to 106 encircles the pin 101a and bears between the cover of the housing 99 and the collar 102. The latch pin 101a is adapted to lock with either of the latch openings 166 or 167. Flexible plugs 185 extend from the member 177 and flexible plugs 186 extend from the member 176. Flexible discs 188, preferably of rubber are supported each at one end of the screws 189 and the latter have formed therewith the operating knobs 190. The screws 189 are in threaded engagement with openings in the members 178.

The wash tub for the washing machine is shown having the front wall 200, the rear wall 201, the side walls 202, and the bottom wall 203 having the outlet opening 204 with the outlet plug 205.

The brackets 175 are supported upon the top edges of the side walls 202, the flexible discs 188 bearing against the outer faces of the walls 202.

Referring to Figs. 5, 6, and 7, the invention is indicated with a modification. In this modification, as already described, supporting pins are shown at 116, with the washers 117 and 118. The pins 120 are shown with the washers 121 and 122. The stem is again indicated at 125. A housing 210 extends from the stem 125. A sleeve 212, having the bottom wall 213 is guided in the housing 210 and has connected thereto the ball 215 having the opening 216. The ball is seated in the support comprising members 217 and 218 which are bolted to each other by the bolts 219. An opening 220 is formed with the members 217 and 218 which is axial with the opening 216. A spherical adjusting plate 221 is seated in the member 218, and an adjusting screw 222 in threaded engagement with the member 218 positions the plate 221 against the ball 215, to obtain the requisite friction between said ball 215, and the support comprising the members 217 and 218. A bolt 225 has its upper end in threaded engagement with the housing 210 and extends through the wall 213. The head of the bolt 225 is shown at 226. A spring 228 encircles the bolt 225.

The hood shaped shell 130a is indicated with the neck 230 and the latter is bolted to the members 217 and 218 by the bolts 231.

The bracket 68 and the locking projection 52 are adapted to have engaged therewith a clothes wringer as described in my patent application filed September 22nd, 1932, Serial Number 634,327. The electric motor 40 is actuated by electric appurtenances, as described in my said application, Serial Number 634,327.

The washing machine when not in use is swung 180 degrees from the position indicated in the drawings to lower it in its wash tub. This is accomplished by disengaging the latch pins 101a having the operating knobs 103a from the latch openings 166. The operator then grasps handle 90 and swings the washing machine until the said latch pins having the operating knobs 103a engage the latch openings 167.

The clothes to be washed, the soap and the water or other fluid are located in the wash tub. The electric motor 40 is started whereby the oscillating shaft 58 is oscillated. By this means the stems 125 with their suction plungers having the shells 130 are reciprocated and beat the clothing in the wash tub. A partial vacuum is produced between the plungers and the clothing when the plungers rise. The openings in the lower head 145 break the said vacuum when the plungers are spaced from the fluid in the wash tub which allows the clothing to drop. If there is excessive pressure against the lower heads 145, the springs 135 will be compressed and cause the suction plungers having the shells 130 to move upwardly and relieve the pressure. Should excessive pressure be met by the heads 145, by any foreign obstruction, the springs 135 allow the plungers having the shells 130 to tilt and thereby avoid injury to the suction plungers. The tilting of the suction plungers is one of the novel points of this application.

If desired the oscillating beams 95 and 110 may be raised from the position indicated in the drawings, and which is desirable when a large quantity of clothing to be washed is located in the wash tub.

This is accomplished by unlocking the oscillating beam 95 from the flat sides 66 of the supporting collar 65, which is done by disengaging the latch pin 101 having the knob 103, from the opening 104. Then both the oscillating beams 95 and 110 may be withdrawn from the position indicated in the drawings. The operator then raises the beams 95 and 101 and engages the opening 97 of the beam 95 with the upper guide pin 80, and engages the opening 111 of the beam 110 with the flat sides 66 of the supporting collar 65 and locks the latch pin 101 of the beam 110 with the opening 104.

Referring to the modification indicated in Figs. 5, 6, and 7 when the suction plungers having the hood shaped shells 130a, descend and contact with the clothing in the wash tub the springs 228 are compressed.

If the suction plungers contact with a serious obstruction they will tilt on the ball 215, which latter with its appurtenances constitutes a ball and socket joint.

Referring to Fig. 8, the guide rods 129 and 133 are omitted and the spring 135 has one end fastened to the housing 128 and its other end is fastened to the plug 132.

Various modifications may be made in the invention and the present exemplification is to be taken as illustrative and not limitative thereof.

Having described my invention, I claim:

1. In a washing machine the combination of a platform of the washing machine, a pair of supporting brackets adjustably fastened to the said platform at opposite ends thereof, a trunnion extending from each supporting bracket, a clamping bracket coacting with each supporting bracket, a sleeve extending from each clamping bracket engaging the trunnion of its accompanying supporting bracket and locking means between each of said sleeves and its coacting trunnion, to lock the supporting brackets with the washing machine in different angular positions.

2. In a washing machine the combination of a platform of the washing machine, a pair of supporting brackets adjustably fastened to the said platform at opposite ends thereof, a trunnion extending from each supporting bracket, said trunnions having each a pair of latch openings spaced from each other, a clamping bracket coacting with each supporting bracket, a sleeve extending from each clamping bracket engaging the trunnion of the accompanying supporting bracket and a latch pin carried on each sleeve adapted to lock with either one of the latch openings of its accompanying trunnion.

3. In a washing machine the combination of a platform therefor, a pair of supporting brackets adjustably fastened to the platform at opposite ends thereof, a trunnion integral with each supporting bracket, said trunnions each having a pair of latch openings spaced from each other and extending some distance below the circumferential surface thereof, each trunnion having a groove in its circumferential surface connecting its latch openings, U shaped clamping brackets adapted to be supported upon the top edges of a pair of walls of a wash tub coacting with said supporting brackets, cushioning means between the clamping brackets and said walls of the wash tub, a sleeve integral with each clamping bracket supported on the trunnion of the adjacent supporting bracket and a latch pin for each sleeve adapted to lock with either of the latch openings in its coacting trunnion.

4. In a washing machine the combination of a platform therefor, a pair of supporting brackets adjustably fastened to said platform at opposite ends thereof, a trunnion extending from each supporting bracket, said trunnions having each a pair of latch openings spaced from each other extending some distance below the circumferential surface thereof, each trunnion having a groove in its circumferential surface connecting its latch openings, U shaped clamping brackets adapted to be supported upon the top edges of walls of a wash tub coacting with said supporting brackets, a sleeve integral with each clamping bracket supported upon its coacting trunnion, a latch housing extending from each sleeve, a detachable cover for each housing, a latch pin extending through said cover and an opening in its coacting sleeve, a collar on the latch pin and a spring encircling the latch pin bearing between said collar and the cover of the housing, said latch pin adapted to lock with either of the latch openings of its coacting trunnion.

CHARLES S. BOSSIE.